United States Patent Office 3,411,944

Patented Nov. 19, 1968

3,411,944

HEAT STABLE MAGNETIC COATING COMPOSITION

Louis M. Higashi, San Jose, Calif., assignor to Memorex Corporation, Santa Clara, Calif., a corporation of California

No Drawing. Filed June 14, 1965, Ser. No. 463,885

5 Claims. (Cl. 117—121)

This invention relates to magnetic recording media and more particularly to a magnetic coating composition and a method of producing the same whereby magnetic tapes may be produced with improved heat resistance.

In the development of high quality magnetic recording media, it is becoming increasingly important to provide a magnetic coating having stability at high temperatures. Tapes of this type are necessary to provide magnetic recording elements which can be used in space vehicles and in new tape recording instruments where the tapes are subjected to high surface temperatures.

Magnetic coating compositions known heretofore have had serious deficiencies when subjected to high temperatures. Those coatings which are thermoplastic and have relatively low softening points tend to adhere to the underside of flexible substrates, and even the high quality coatings made from copolymers of vinyl chloride, vinyl acetate, vinylidene chloride, etc., and having higher softening points, are subject to chemical degradation at elevated temperatures. This thermal degradation of these vinyl copolymers is often accompanied by release of HCl which attacks the flexible substrates of magnetic tapes and renders the tapes useless.

In accordance with this invention, a novel magnetic recording media is produced having greatly improved stability at high temperatures while at the same time providing to a satisfactory or improved degree the other desirable characteristics of magnetic tapes such as abrasion resistance, strength, adhesion, resistance to blocking, and excellent magnetic properties.

When the magnetic coatings of this invention are produced by one particular series of method steps, the coatings may be produced more easily and rapidly because the magnetic pigment particles will disperse in coating more easily.

Additionally, it is possible to produce magnetic coatings in accordance with this invention with a higher loading of magnetic pigment in a given amount of binder.

In accordance with this invention, magnetic recording media are produced by the following steps:

(A) Forming a pigment mixture containing:

(1) Between about 60 and 85 parts by weight of a magnetic pigment and (2) Between about 0.8 and 8 parts by weight of a silane polyol selected from the class consisting of a silane polyol having the general formula

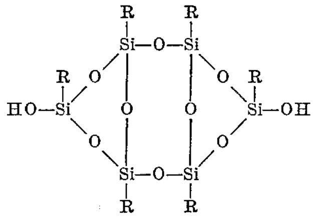

where each R indicates a hydrocarbon group containing 1 to 20 carbon atoms, and a silane polyol having the general formula $$HO-\underset{R}{\overset{R'}{Si}}-\left[O-\underset{R}{\overset{R'}{Si}}\right]_N-O-\underset{OH}{\overset{R'}{Si}}O-\underset{R}{\overset{R'}{Si}}-OH$$

where R is an aliphatic hydrocarbon group containing 1 to 10 carbon atoms, and R' is a phenyl group, (B) Dispersing said pigment mixture in a mixture of:

(1) Between about 0.6 and 9.5 parts by weight of a low molecular weight diol selected from the class consisting of primary and secondary aliphatic glycols containing 2 to 22 carbon atoms, polyether glycols containing 4 to 22 carbon atoms and polyester glycols having a hydroxyl number of 10 to 100 and having the following general formula $$HO-[R-O-\overset{O}{\overset{\|}{C}}-R'-\overset{O}{\overset{\|}{C}}-O-R]_N-OH$$

where R is the carbon chain of a glycol represented by $$-(CH_2)_2-$$
$$-CH_2)_3)-$$
$$-CH_2\underset{\substack{|\\CH_3}}{C}H_2-$$
$$-CH_2CH_2OCH_2CH_2-$$

and R' is an aliphatic hydrocarbon radical containing about 6 to 16 carbon atoms, and N is an integer having a value such that the molecular weight of the low molecular weight polyester diol is 216 to 3240, and (2) Between about 8.0 and 25.8 parts by weight of a high molecular weight diol having a hydroxyl number of 1 to 40 and having the following general formula $$HO-[(CH_2CH_2)_xO\overset{O}{\overset{\|}{C}}R\overset{O}{\overset{\|}{C}}O(CH_2CH_2)_xO\overset{O}{\overset{\|}{C}}R'\overset{O}{\overset{\|}{C}}O(CH_2CH_2)_x]_NOH$$

where R is a benzene ring, in the ortho, meta, or para configuration, R' is an aliphatic hydrocarbon radical containing about 6–16 carbon atoms, X is an integer from 7 to 30, and N is an integer having a value such that the molecular weight of the high molecular weight polyester is approximately 10,000 to 30,000, (C) Adding to said mixture about 1.0 to 9.2 parts by weight of a triisocyanate selected from the class consisting of triphenyl methane triisocyanate and a prepolymer having the general formula $$C_2H_5C(CH_2O\overset{O}{\overset{\|}{C}}\overset{H}{\overset{|}{N}}RNCO)_3$$

where R is a divalent benzene radical containing an aliphatic hydrocarbon side chain of 0 to 18 carbon atoms in an amount sufficient to contribute to said mixture from 0.5 to 1.5 mols of reactive isocyanate groups per mol of reactive hydroxyl groups contributed to said mixture by said two diols and said polyol, (D) Coating said mixture on a supporting surface, and (E) Reacting said triisocyanate with said diols and said polyol.

The mixture of magnetic pigment and silanol should be substantially moisture free, and the low molecular weight and high molecular weight diols are also moisture free to avoid consumption of isocyanate groups in the binder by reaction with water. The coatings can be prepared without mixing the silanol with the magnetic pigment prior to addition of the other binder components, but the silanol apparently functions as a dispersant for the pigment particles, and mixing of all of the coating components can be accomplished more easily if the silanol and pigment are mixed first.

The low molecular weight diol is employed in an amount of about 2 to 90 weight percent based on the total weight of the low molecular weight diol and high molecular weight diol with the lower percentages used where the low molecular weight diol has a high hydroxyl number. For instance, where propane diol-1,5 is used as the low molecular weight diol, best results are obtained where the propane diol-1,5 constitutes about 2.75 to about 15.8 weight percent of the total diol, and where the polyester diol is used as the low molecular weight diol, best results are obtained where it constitutes about 12 to about 50 weight percent of the total diol. The high molecular weight polyester diol is referred to herein as a diol, but does not necessarily have two hydroxyl groups.

The silane polyol is preferably used in a sufficient amount that it forms from about 2 to about 30 percent of the total weight of the two diols and the triisocyanate. At lower concentrations of the silanol, sacrifices in temperature stability result, and at high concentrations other advantageous properties of the coating deteriorate.

The mixing of the magnetic pigment, the silane polyol and the high and low molecular weight diols may be carried out in any suitable manner, and there are preferably encorporated into the mixture at this point a solvent which is free of reactive hydroxyl and isocyanate groups and a catalytic amount of a catalyst such as triethylene diamine, methyl amine, triethanol amine, urea, lead octoate, dibutyltin dilaurate, and metal acetylacetonates.

The mixture of magnetic pigment, silanol, low molecular weight diol, and high molecular weight diol containing the catalyst and solvent if desired is mixed to uniformity for instance in a paint ball mill for a period of 10 to 20 hours, and thereafter the triisocyanate is added to the mixture. In this regard, it should be noted that advantages in the shelf life of the mixture after the triisocyanate has been added are obtained where the aromatic group in the triisocyanate (the group R mentioned above in the formula) contains the alkyl side chain of at least one carbon atom as a substituent on the benzene ring adjacent to the reactive isocyanate group.

The components of the recording media are preferably employed in the following amounts, the parts given being parts by weight: where the low molecular weight diol is the polyester base diol, 3.7–9.5 parts of the low molecular weight diol are employed with 60–85 parts of magnetic powder, 9.5–25.8 parts of the high molecular weight diol, 0.8 to 2.0 parts of the silane polyol, 1.0–2.7 parts of the prepolymer triisocyanate, 50–80 parts of ketone solvent, and 0.05 to 1.0 part of triethylene diamine, and the low molecular weight diol forms 20 to 80 percent of the combined weight of the low molecular weight diol and high molecular weight diol. Where the low molecular weight glycol or the polyether diol is employed as the low molecular weight diol, 60 to 80 parts of magnetic powder are employed with 0.6 to 1.5 parts of the low molecular weight glycol, and 8.0 to 21.3 parts of the high molecular weight polyester diol, 4.0 to 8.0 parts of the silane polyol, 7.4 to 9.2 parts of the prepolymer triisocyanate, 50–80 parts of ketone and 0.05 to 1.0 part of dibutyltin dilaurate. The amount of triisocyanate is selected to contribute about 0.50 to about 1.50 and preferably about 0.85 mol of reactive isocyanate groups per mol of reactive hydroxyl groups contributed by the diols and the silanol.

The following specific examples are set forth for the purpose of illustrating the practice of the invention. Many variations and modifications of these examples will be apparent to those skilled in the art and may be made without departing from the spirit and scope of the invention.

Example 1

In this example, the magnetic pigment employed was moisture free gamma ferric oxide. The low molecular weight polyester diol was Multron R16, made by Mobay Chemical Company. This polyester is based on diethylene glycol and adipic acid and has a molecular weight of approximately 2550 and a hydroxyl number of 44.0. The high molecular weight polyester, having a molecular weight of approximately 20,000 and a hydroxyl number of 2.75 was Vitel PE207. This polyester is a product of the Goodyear Chemical Company and is a prepolymer of polyethylene glycol terephthalate and sebacate. The triisocyanate prepolymer was a product sold by Spencer Kellogg Company under the trademark P49–60X and consists of an adduct of one mol of trimethylol propane and three mols of toluene-2,4-diisocyanate prepared as a 60% solids solution in a 50–50 blend of Cellosolve acetate and xylene. Mondur CB60 sold by Mobay Chemical Company and Tranco 375B sold by Trancoa Chemical Company are equivalents.

The 49000 series of Du Pont polyesters having a hydroxyl number of 11 may be used in lieu of Vitel PE207 as well as Goodyear Chemical's Vitel PE100 and Vitel PE200.

Witco Chemical's Foamrez #50 with a hydroxyl value of 52 may be equivalent to Multron R16.

A 20% solution of triphenyl methane triisocyanate in monochloro benzene and having 6.8% free isocyanate content may be used instead of P49–60CX. This prepolymer is manufactured and sold by Mobay Chemical Company under the trademark of Modur TM.

The silane polyol used in this example was a product sold by General Electric under the trademark SR 188 and is the hydrolysis product of phenyltrichlorosilane and an alkyltrichlorosilane. A similar product sold by General Electric under the trademark SR 189 may be used, and other products available on the market as Dow Corning Z–6018 and XZ8–0046 may be used, but the General Electric SR 188 is preferable.

These coating components were employed in the amounts indicated below and used in the method described above with the coating applied to a Mylar substrate in conventional manner and cured at 300° F. for three minutes.

| Ingredients: | Parts by weight |
|---|---|
| Magnetic pigment | 70.00 |
| Multron R16 (low MW diol) | 6.80 |
| 30% Vitel PE 207 (high MW diol) | 63.00 |
| 5% ferric acetylacetonate | 4.65 |
| SR 188 (silane polyol) | 1.43 |
| 60% P49–60CX (triisocyanate) | 4.42 |
| Cyclohexanone solvent | 84.71 |

Ratios of ingredients in Example 1

| | Percent |
|---|---|
| Pigment to total nonvolatile coating | 70 |
| Mols NCO per mol OH | 1.02 |
| Low MW diol to total diol | 26.5 |
| SR188 to total weight of binder | 5 |

Example 2

A similar magnetic coating was prepared from the components of Example 1 using substantially the same concentrations of the components except that the silane polyol was omitted, and test magnetic tapes were made on Mylar in the same way for comparison to the tape of Example 1.

The tapes of Examples 1 and 2 were tested as described below and compared to a premium quality magnetic tape which is available on the market and is made from an unreacted mixture of an elastomeric polyurethane and a copolymer of vinylidene chloride and acrylonitrile. This tape is referred to as the vinyl tape in the following chart of test results.

The results of standard tests for magnetic tapes conducted on the tapes of Examples 1 and 2 and the vinyl tape are summarized in the following chart. In these tests, the "neck down" test is a type of elongation test in which the tape is stretched to test the ability of the coating to stretch and deform without rupturing or losing film integrity. The tapes of Example 1 showed superior performance in this test. The "pencil hardness" test, tests the hardness of the coating, and a pencil hardness of 5H for magnetic coatings is considered to be too stiff and brittle. The coatings of Example 1 showed superior performance over the other two coatings in this test. The weight loss test measures degradation of the coating as a function of the quantity of coating lost during the test period where the material which is lost is generally lost solely from the binder which holds the magnetic pigment together. The "blocking" tests were conducted by winding one-half inch wide coated tapes three feet in length around a quarter inch diameter metal shaft at 30 pounds per square inch, subjecting the tapes to 300° F. for two hours, and then attempting to unwind the tapes.

The tests were conducted on tapes which had been exposed to a temperature of 300° F. for 100 hours and also on tapes which had not been exposed to high temperature, and the results of these tests are summarized as follows:

| | Example 1 | | Example 2 | | Vinyl | |
|---|---|---|---|---|---|---|
| | 0 hr. | 100 hrs. | 0 hr. | 100 hrs. | 0 hr. | 100 hrs. |
| Neck down | A | A | A | B− | A | F. |
| Pencil hardness | 2H− | 2H | H | 3H | HB | 5H. |
| Percent weight loss | 0 | 0.45 | 0 | 0.87 | 0 | 4.52. |
| Blocking test | | Pass | | Fail | | Fail. |
| Flexibility | Negligible change | | Some loss | | Extreme brittleness | |

Examples 3–7

In these examples, the preparation of the magnetic media was repeated in a similar way but employing pentanediol-1,5 as the low molecular weight diol. This low molecular weight diol has a hydroxyl number of 1076 and is the preferred low molecular weight glycol for use in this invention. The lower molecular weight diols yield tough less flexible magnetic coatings of greater hardness while the higher molecular weight diols such as polyethylene and polypropylene glycols yield more flexible softer coatings which are more elastomeric in nature.

The following is a list of alternate diols sold by Union Carbide Company which may be employed, and similar materials are supplied by various manufacturers and may be freely substituted:

ethylene glycol
diethylene glycol
triethylene glycol
tetraethylene glycol
propylene glycol
dipropylene glycol
1,3 propane diol
polypropylene glycols such as
  Niax PPG Nos. 425, 1025, 2025, 3025, 4025
  Niax LG Nos. 56, 168
2-methyl-2-ethyl-1,3 propanediol
2-ethyl-1,3-hexandiol
hexylene glycol Other diols which may be used include butynediol and butenediol, a product of Antara Chemical Company and polyethylene glycols varying in molecular weight from 238 to 6,000 which are sold by the Jefferson Chemical Company. The following formulations in parts by weight were employed for making magnetic recording media, and these media were coated on Mylar films in conventional ways, and the wet coatings were cured at 300° F. for three minutes.

| Ingredients | Examples | | | | |
|---|---|---|---|---|---|
| | 3 | 4 | 5 | 6 | 7 |
| Mol NCO/Mol OH | 0.58 | 0.61 | 0.85 | 0.92 | 1.19 |
| Percent pentanediol in total diol | 3 | 5 | 6.3 | 10 | 6.3 |
| Magnetic pigment | 70.00 | 70.00 | 70.00 | 70.00 | 70.00 |
| 1,5 pentanediol | 0.59 | 0.84 | 1.13 | 1.53 | 1.00 |
| SR 188 (Silanol) | 6.00 | 7.50 | 4.50 | 4.50 | 4.50 |
| 30% Vitel PE 207 (Polyester) | 63.70 | 52.90 | 55.80 | 45.75 | 48.70 |
| 5% Ferric acetylacetonate | 4.64 | 4.64 | 4.64 | 4.64 | 4.64 |
| 60% P49–60 CX triisocyanate | 6.80 | 9.37 | 12.62 | 16.75 | 16.18 |
| Cyclohexanone solvent | 83.28 | 89.81 | 87.41 | 91.86 | 90.03 |

Magnetic tapes prepared in accordance with Examples 3 through 7 were subjected to the standard tests mentioned above, and compared in these tests to a polyurethane binder system similar to the systems employed in Examples 3 through 7 but omitting the silanol, and also compared to a vinyl binder system similar to that mentioned above. The results of these tests are summarized in the following chart:

| | Example | | | | | | | | | | | | | |
|---|---|---|---|---|---|---|---|---|---|---|---|---|---|---|
| | 3 | | 4 | | 5 | | 6 | | 7 | | Urethane | | Vinyl | |
| Hours | 0 | 100 | 0 | 100 | 0 | 100 | 0 | 100 | 0 | 100 | 0 | 100 | 0 | 100 |
| Neck down | A | A | A | A | A | A | A | A | A | A | A | C | A | F. |
| Pencil Hardness | H− | H | H− | H | 2H | 2H | 2H | 2H | H | H | H | 5H | HB | 5H. |
| Percent weight loss | | 0.59 | | 0.62 | | 0.43 | | 0.56 | | 0.23 | | 0.82 | | 4.52. |
| Block test | | Pass | | Pass | | Pass | | Pass | | Pass | | Fail | | Fail. |
| Roll test | A | A | A | A | A | A | A | A | A | A | A | A | A | F. |
| Wrinkle | A− | A | A− | B | A | A | B | B | A | B | A | A− | A | D. |

I claim:

1. A magnetic recording media which comprises a support means and a magnetic pigment dispersed in a polymeric binder coated on said support means where said binder comprises:

(A) a low molecular weight diol selected from the class consisting of primary and secondary aliphatic glycols containing 2 to 22 carbon atoms, polyether glycols containing 4 to 22 carbon atoms and polyester glycols having a hydroxyl number of 10 to 100 and having the following general formula $$HO-[R-O-\overset{O}{\overset{\|}{C}}-R'-\overset{O}{\overset{\|}{C}}-O-R-]_N-OH$$

where R is the carbon chain of a glycol represented by $$-(CH_2)_2-$$
$$-(CH_2)_3-$$
$$-CH_2\underset{\underset{CH_3}{|}}{C}H_2-$$
$$-CH_2CH_2OCH_2CH_2-$$

and R' is an aliphatic hydrocarbon radical containing about 6 to 16 carbon atoms, and N is an integer having a value such that the molecular weight of the low molecular weight polyester diol is 216 to 3240, (B) a high molecular weight diol having a hydroxyl number of 1 to 40 and having the following general formula $$HO-[(CH_2CH_2)_xO\overset{O}{\overset{\|}{C}}R\overset{O}{\overset{\|}{C}}O(CH_2CH_2)_xO\overset{O}{\overset{\|}{C}}R'\overset{O}{\overset{\|}{C}}O(CH_2CH_2)_x]_NOH$$

where R is a benzene ring, in the ortho, meta, or para configuration, R' is an aliphatic hydrocarbon radical containing about 6–16 carbon atoms, X is an integer from 7 to 30, and N is an integer having a value such that the molecular weight of the high molecular weight polyester is approximately 10,000 to 30,000, (C) a silane polyol selected from the class consisting of a silane polyol having the general formula

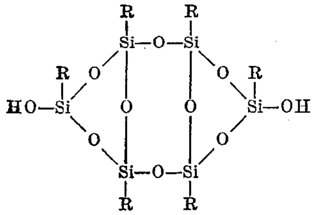

where each R indicates a hydrocarbon group containing 1 to 20 carbon atoms, and a silane polyol having the general formula $$HO-\underset{R}{\overset{R'}{Si}}-\left[O-\underset{R}{\overset{R'}{Si}}\right]_N-O-\underset{OH}{\overset{R'}{Si}}O-\underset{R}{\overset{R'}{Si}}-OH$$

where R is an aliphatic hydrocarbon group containing 1 to 10 carbon atoms, and R' is a phenyl group, and (D) a triisocyanate selected from the class consisting of triphenyl methane triisocyanate and a prepolymer having the general formula $$C_2H_5C(CH_2O\overset{O}{\overset{\|}{C}}\overset{H}{\overset{|}{N}}RNCO)_3$$

where R is a divalent benzene radical containing an aliphatic hydrocarbon side chain of 0 to 18 carbon atoms, (E) the low molecular weight diol forming from about 2 to about 90 weight percent of the combined weights of said two diols, (F) the weight of said silane polyol forming from about 2 to about 30 percent of the weight of said other components of said binder, (G) said triisocyanate being present in an amount sufficient to contribute to said binder from 0.5 to 1.5 mols of reactive isocyanate groups per mol of reactive hydroxyl groups contributed to said binder by said two diols and said polyol, and (H) said triisocyanate being chemically reacted with both of said diols and with said polyol.

2. A magnetic recording media which comprises:

(A) 60–85 parts by weight of magnetic particles, (B) a polymeric binder for said particles containing chemically reacted together, (1) 3.7–9.5 parts by weight of diethylene glycol adipate having a molecular weight of about 2550 and a hydroxyl number of about 44, (2) 9.5–25.8 parts by weight of polyethylene glycol terephthalate sebacate having a molecular weight of about 20,000 and a hydroxyl number of about 2.75, (3) 0.8–2.0 parts by weight of a silane diol having the general formula

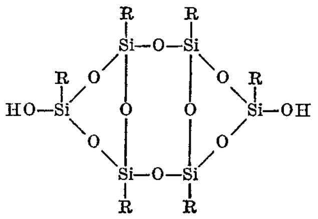

where each R represents a hydrocarbon group having 1 to 20 carbon atoms, and (4) 1.0 to 2.7 parts by weight of an adduct of one mol of trimethylol propane and three mols of toluene-2,4 diisocyanate.

3. A magnetic recording media which comprises:

(A) 60–80 parts by weight of magnetic particles, and (B) a polymeric binder for said particles containing chemically reacted together, (1) 0.6 to 1.5 parts by weight of propanediol-1,5, (2) 8.0 to 21.3 parts by weight of polyethylene glycol terephthalate sebacate having a molecular weight of about 20,000 and a hydroxyl number of about 2.75, (3) 4.0 to 8.0 parts by weight of a silane diol having the general formula

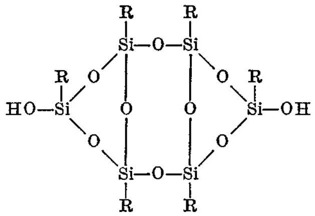

where each R represents a hydrocarbon group having 1 to 20 carbon atoms, and (4) 7.4 to 9.2 parts by weight of an adduct of one mol of trimethylol propane and three moles of toulene-2,4 diisocyanate.

4. A method of making a magnetic recording media which comprises:

(A) forming a mixture containing (1) a magnetic pigment, (2) a low molecular weight diol selected from the class consisting of primary and secondary aliphatic glycols containing 2 to 22 carbon atoms, polyether glycols containing 4 to 22 carbon atoms and polyester glycols having a hydroxyl number of 10 to 100 and having the following general formula $$HO-[R-O-\overset{O}{\overset{\|}{C}}-R'-\overset{O}{\overset{\|}{C}}-O-R-]_N-OH$$

where R is the carbon chain of a glycol represented by $$-(CH_2)_2-$$
$$-(CH_2)_3-$$
$$-CH_2\underset{CH_3}{\underset{|}{CH_2}}-$$
$$-CH_2CH_2OCH_2CH_2-$$

and R' is an aliphatic hydrocarbon radical containing about 6 to 16 carbon atoms, and N is an integer having a value such that the molecular weight of the low molecular weight polyester diol is 216 to 3240, (3) a high molecular weight diol having a hydroxyl number of 1 to 40 and having the following general formula $$HO-[(CH_2CH_2)_xO\overset{O}{\overset{\|}{C}}R\overset{O}{\overset{\|}{C}}O(CH_2CH_2)O\overset{O}{\overset{\|}{C}}R'\overset{O}{\overset{\|}{C}}O(CH_2CH_2)_x]_NOH$$

where R is a benzene ring, in the ortho, meta, or para configuration, R' is an aliphatic hydrocarbon radical containing about 6–16 carbon atoms, X is an integer from 7 to 30, and N is an integer having a value such that the molecular weight of the high molecular weight polyester is approximately 10,000 to 30,000, and (4) a silane polyol selected from the class consisting of a silane polyol having the general formula

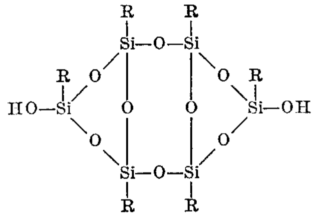

where each R indicates a hydrocarbon group containing 1 to 20 carbon atoms, and a silane polyol having the general formula

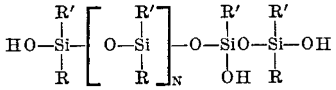

where R is an aliphatic hydrocarbon group containing 1 to 10 carbon atoms, and R′ is a phenyl group, and (5) with said low molecular weight diol forming about 10 to about 90 weight percent of the combined weights of said two diols, and (6) the weight of said silane polyol forming from about 2 to 43 weight percent of the combined weight of said diols (B) mixing said mixture until said mixture is substantially homogeneous, (C) adding to said mixture a triisocyanate selected from the class consisting of triphenyl methane triisocyanate and a prepolymer having the general formula $$C_2H_5C(CH_2O\overset{O}{\overset{\|}{C}}\overset{H}{\overset{|}{N}}RNCO)_3$$

where R is a divalent benzene radical containing an aliphatic hydrocarbon side chain of 0 to 18 carbon atoms with the amount of said triisocyanate being sufficient to provide in said mixture 0.5 to 1.5 mols of active isocyanate groups per mol of active hydroxyl groups in said mixture, (D) coating said mixture on a supporting surface, and (E) reacting said triisocyanate with said diols and said polyol.

5. A method of making a magnetic recording media which comprises:

(A) forming a pigment mixture containing (1) between about 60 and 85 parts by weight of a magnetic pigment and (2) between about 0.8 and 8 parts by weight of a silane polyol selected from the class consisting of a silane polyol having the general formula

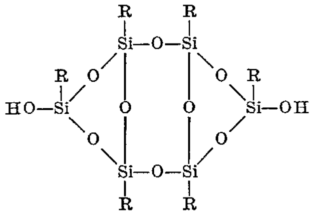

where each R indicates a hydrocarbon group containing 1 to 20 carbon atoms, and a silane polyol having the general formula

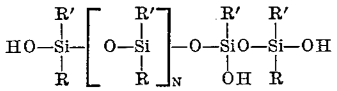

where R is an aliphatic hydrocarbon group containing 1 to 10 carbon atoms, and R′ is a phenyl group, (B) dispersing said pigment mixture in a mixture of (1) between about 0.6 and 9.5 parts by weight of a low molecular weight diol selected from the class consisting of primary and secondary aliphatic glycols containing 2 to 22 carbon atoms, polyether glycols containing 4 to 22 carbon atoms and polyester glycols having a hydroxyl number of 10 to 100 and having the following general formula $$HO-[R-O-\overset{O}{\overset{\|}{C}}-R'-\overset{O}{\overset{\|}{C}}-O-R]_N-OH$$

where R is the carbon chain of a glycol represented by $$-(CH_2)_2-$$

$$-(CH_2)_3-$$

$$-CH_2\underset{CH_3}{\underset{|}{CH_2}}-$$

$$-CH_2CH_2OCH_2CH_2-$$

and R′ is an aliphatic hydrocarbon radical containing about 6 to 16 carbon atoms, and N is an integer having a value such that the molecular weight of the low molecular weight polyester diol is 216 to 3240, and (2) between about 8.0 and 25.8 parts by weight of a high molecular weight diol having a hydroxyl number of 1 to 40 and having the following general formula $$HO-[(CH_2CH_2)_xO\overset{O}{\overset{\|}{C}}R\overset{O}{\overset{\|}{C}}O(CH_2CH_2)_xO\overset{O}{\overset{\|}{C}}R'\overset{O}{\overset{\|}{C}}O(CH_2CH_2)_x]_NOH$$

where R is a benzene ring, in the ortho, meta, or para configuration, R′ is an aliphatic hydrocarbon radical containing about 6–16 carbon atoms, X is an integer from 7 to 30, and N is an integer having a value such that the molecular weight of the high molecular weight polyester is approximately 10,000 to 30,000, (C) adding to said mixture about 1.0 to 9.2 parts by weight of a triisocyanate selected from the class consisting of triphenyl methane triisocyanate and a prepolymer having the general formula $$C_2H_5C(CH_2O\overset{O}{\overset{\|}{C}}\overset{H}{\overset{|}{N}}RNCO)_3$$

where R is a divalent benzene radical containing an aliphatic hydrocarbon side chain of 0 to 18 carbon atoms in an amount sufficient to contribute to said mixture from 0.5 to 1.5 mols of reactive isocyanate groups per mol of reactive hydroxyl groups contributed to said mixture by said two diols and said polyol, (D) coating said mixture on a supporting surface, and (E) reacting said triisocyanate with said diols and said polyol.

References Cited

UNITED STATES PATENTS

| | | | |
|---|---|---|---|
| 2,511,310 | 6/1950 | Upson | 260—46.5 |
| 2,901,467 | 8/1959 | Croco | 260—77.5 |
| 3,150,995 | 9/1964 | Bauer | 117—138.8 |
| 3,216,846 | 11/1965 | Hendricx et al. | 117—62 |
| 3,320,090 | 5/1967 | Graubart | 117—161 |

FOREIGN PATENTS

| | | |
|---|---|---|
| 750,853 | 3/1965 | Canada. |

WILLIAM D. MARTIN, *Primary Examiner.*

W. D. HERRICK, *Assistant Examiner.*